US009261368B2

(12) United States Patent
Beaurepaire

(10) Patent No.: US 9,261,368 B2
(45) Date of Patent: Feb. 16, 2016

(54) METHOD AND APPARATUS FOR USING A DEVICE FLASHLIGHT AS FEEDBACK FOR GUIDANCE PURPOSES

(75) Inventor: Jerome Beaurepaire, Berlin (DE)

(73) Assignee: HERE Global B.V., Veldhoven (NL)

( * ) Notice: Subject to any disclaimer, the term of this patent is extended or adjusted under 35 U.S.C. 154(b) by 281 days.

(21) Appl. No.: 13/527,975

(22) Filed: Jun. 20, 2012

(65) Prior Publication Data

US 2013/0345974 A1 Dec. 26, 2013

(51) Int. Cl.
| | |
|---|---|
| G01C 21/36 | (2006.01) |
| G01C 21/20 | (2006.01) |
| G09B 29/00 | (2006.01) |
| G09B 29/10 | (2006.01) |
| H04W 4/02 | (2009.01) |

(52) U.S. Cl.
CPC .............. *G01C 21/20* (2013.01); *G01C 21/365* (2013.01); *G09B 29/007* (2013.01); *G09B 29/10* (2013.01); *H04W 4/026* (2013.01)

(58) Field of Classification Search
CPC .... G01C 21/3632; H04W 4/026; G08B 7/066
See application file for complete search history.

(56) References Cited

U.S. PATENT DOCUMENTS

| | | | | |
|---|---|---|---|---|
| 8,098,894 | B2* | 1/2012 | Soderstrom | 382/104 |
| 8,427,536 | B2* | 4/2013 | Jiang et al. | 348/135 |
| 8,457,654 | B1* | 6/2013 | Roskind | 455/456.1 |
| 2011/0257966 | A1 | 10/2011 | Rychlik | |
| 2011/0267179 | A1* | 11/2011 | Patterson | 340/286.02 |
| 2012/0078511 | A1* | 3/2012 | Lim | 701/437 |
| 2012/0176525 | A1* | 7/2012 | Garin et al. | 348/333.02 |
| 2013/0103309 | A1* | 4/2013 | Cai et al. | 701/515 |

FOREIGN PATENT DOCUMENTS

| | | |
|---|---|---|
| JP | 2004-093358 A | 3/2004 |
| JP | 2004-340930 A | 12/2004 |
| KR | 2009-0129589 A | 12/2009 |
| WO | 2006/120850 A1 | 11/2006 |

OTHER PUBLICATIONS

Rapp, "Spotlight Navigation: a Pioneering User Interface for Mobile Projection", Proceedings of Ubiprojection, 2010, pp. 1-4.*
International Search Report and Written Opinion for PCT/EP2013/061556 mailed Aug. 29, 2013, 14 pages.
Schoning, J. et al., "Map Torchlight: A Mobile Augmented Reality Camera Projector Unit." CHI2009—Spotlight on Works in Progress, Apr. 4, 2009-Apr. 9, 2009, pp. 3941-3845, XP040469518.

(Continued)

*Primary Examiner* — John R Olszewski
*Assistant Examiner* — Todd Melton
(74) *Attorney, Agent, or Firm* — Ditthavong & Steiner, P.C.

(57) ABSTRACT

An approach is provided for linking the navigation and flashlight functions of a mobile device for guidance purposes. A coordination platform determines mapping information, navigation information, or a combination thereof associated with at least one device. The coordination platform determines at least one operational parameter for at least one flashlight component of the at least one device based, at least in part, on the mapping information, the navigation information, or a combination thereof. The coordination platform causes, at least in part, a configuration of the at least one flashlight component based, at least in part, on the at least one operational parameter.

20 Claims, 9 Drawing Sheets

(56) References Cited

OTHER PUBLICATIONS

"Satellite Television Tracking—Dependable Routing System", web page, Jan. 26, 2012, http://sprintek.net/tag/gps-navigation/.

Navigon, "Update expands NAVIGON MobileNavigator for Android smartphones to include a flashlight function", web page, pp. 1-3, http://www.navigon.com/export/sites/default/common/downloads/presse/PR__Android__Update__3__5__4__MWC2011.html.

Thakur, "Way-Go Torch Flashlight Merges GPS with Laser Projection to Guide in Dark", web page, 2012, http://www.gizmowatch.com/torch-flashlight-merges-gps-laser-projection-guide-dark.html.

\* cited by examiner

METHOD AND APPARATUS FOR USING A DEVICE FLASHLIGHT AS FEEDBACK FOR GUIDANCE PURPOSES

BACKGROUND

Service providers and device manufacturers (e.g., wireless, cellular, etc.) are continually challenged to deliver value and convenience to consumers by, for example, providing compelling network services. One area of interest has been the development of location-based services to provide pedestrians using mobile devices (e.g., mobile phones or tablets) with navigation assistance to improve the quality of their travels. By way of example, many mobile devices are now equipped with global positioning system (GPS) receivers and mapping and/or navigation applications for presenting location-based information (e.g., maps, travel directions, route details, points of interest (POIs), and the like) to users. In addition, many of these devices also are equipped with applications to control the flashlight components of the device. However, the mapping and/or navigation applications and the flashlight applications currently operate as separate entities and therefore do not share information. As a result, users in dark unfamiliar environments must choose to either look at the screen of their mobile device without illuminating their surroundings or illuminate their surroundings without obtaining guidance information. Accordingly, service providers and device manufacturers face significant technical challenges in providing a service that links or coordinates the navigation and flashlight functions of a mobile device so that the flashlight component can inform users when and where to turn.

SOME EXAMPLE EMBODIMENTS

Therefore, there is a need for an approach for linking the navigation and flashlight functions of a mobile device for guidance purposes.

According to one embodiment, a method comprises determining mapping information, navigation information, or a combination thereof associated with at least one device. The method also comprises determining at least one operational parameter for at least one flashlight component of the at least one device based, at least in part, on the mapping information, the navigation information, or a combination thereof. The method further comprises causing, at least in part, a configuration of the at least one flashlight component based, at least in part, on the at least one operational parameter.

According to another embodiment, an apparatus comprises at least one processor, and at least one memory including computer program code for one or more computer programs, the at least one memory and the computer program code configured to, with the at least one processor, cause, at least in part, the apparatus to determine mapping information, navigation information, or a combination thereof associated with at least one device. The apparatus is also caused to determine at least one operational parameter for at least one flashlight component of the at least one device based, at least in part, on the mapping information, the navigation information, or a combination thereof. The apparatus is further caused to cause, at least in part, a configuration of the at least one flashlight component based, at least in part, on the at least one operational parameter.

According to another embodiment, a computer-readable storage medium carries one or more sequences of one or more instructions which, when executed by one or more processors, cause, at least in part, an apparatus to determine mapping information, navigation information, or a combination thereof associated with at least one device. The apparatus is also caused to determine at least one operational parameter for at least one flashlight component of the at least one device based, at least in part, on the mapping information, the navigation information, or a combination thereof. The apparatus is further caused to cause, at least in part, a configuration of the at least one flashlight component based, at least in part, on the at least one operational parameter.

According to another embodiment, an apparatus comprises means for determining mapping information, navigation information, or a combination thereof associated with at least one device. The apparatus also comprises means for determining at least one operational parameter for at least one flashlight component of the at least one device based, at least in part, on the mapping information, the navigation information, or a combination thereof. The apparatus further comprises means for causing, at least in part, a configuration of the at least one flashlight component based, at least in part, on the at least one operational parameter.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for linking the navigation and flashlight functions of a mobile device for guidance purposes are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
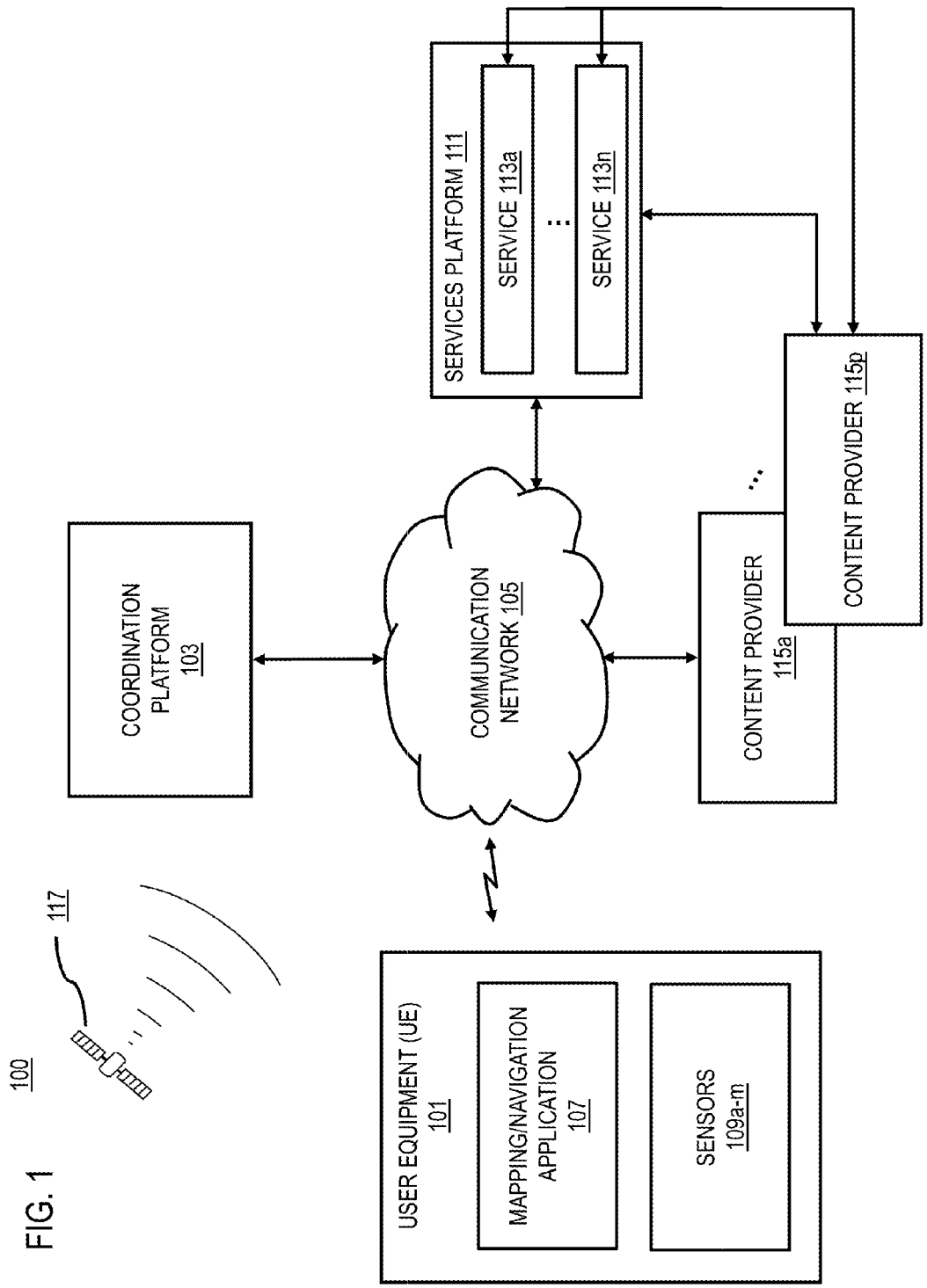
FIG. 1 is a diagram of a system capable of linking the navigation and flashlight functions of a mobile device for guidance purposes, according to one embodiment.

FIG. 1 is a diagram of a system capable of linking the navigation and flashlight functions of a mobile device for guidance purposes, according to one embodiment. As previously discussed, one area of interest among service providers and device manufacturers has been the development of location-based services (e.g., mapping and/or navigation applications) to provide pedestrians using mobile devices with location-based information (e.g., maps, travel directions, route details, POIs, and the like) to improve the quality of their travels. In addition, many of these devices also are equipped with applications to control the flashlight components of the device. However, the mapping and/or navigation applications and the flashlight applications currently operate as separate entities and therefore do not exchange information. As a result, users in dark unfamiliar environments must choose to either look at the screen of their mobile devices without illuminating their surroundings or illuminate their surrounding without obtaining guidance information.

To address this problem, a system 100 of FIG. 1 introduces the capability to link the navigation and flashlight functions of a mobile device for guidance purposes. In one embodiment, the system 100 first determines mapping information, navigation information, or a combination thereof associated with at least one device (e.g., a mobile phone or a tablet). The system 100 next determines an input for specifying the one or more routes, the one or more guidance instructions, the one or more destinations, the one or more features (e.g., a POI or an item of interest in the surrounding environment), or a combination thereof. By way of example, a user on vacation may want to take a walk in an unfamiliar area one night after dinner. In particular, the user may want to walk from his or her hotel to a well-known point of interest (e.g., the Eiffel Tower). Accordingly, the user may input the destination in a mapping and/or navigation application on his or her mobile device to obtain directions to the destination. In addition to inputting a specific address, geo-coordinates, the name of a famous POI (e.g., the Eiffel Tower), etc., if the mapping and/or navigation application has access to one or more interior floor maps, then the user may also input a specific feature such as an office number or a building floor (e.g., office 703 or the $7^{th}$ Floor). It is contemplated that the input may include, at least in part, an entry using a user interface of the at least one device, one or more voice commands, one or more images of a particular point of interest, etc.

In one or more embodiments, the system 100 then determines the one or more routes, for example, associated with the mapping information, the navigation information, or a combination thereof. It is contemplated that in areas where limited mapping and/or navigation information is available (e.g., in the countryside), the system 100 may determine the one or more routes based on a straight line trajectory between a starting point and the end destination. In one embodiment, the system 100 next determines at least one operational parameter for at least one flashlight component of the at least one device based, at least in part, on the mapping information, the navigation information, or a combination thereof. More specifically, the at least one operational parameter includes, at least in part, a light intensity parameter (e.g., increasing or decreasing the intensity of emitted light), a blinking frequency parameter (e.g., increasing or decreasing the speed or the number of blinks), a light direction parameter (e.g., shifting the direction of the emitted light), a light color parameter (e.g., projecting a green or a red light to indicate a right or wrong direction, respectively), or a combination thereof. Further, the at least one flashlight component includes, at least in part, an array of one or more lights, wherein the at least one operational parameter is for operating at least a portion of the array. By way of example, the at least one flashlight component may include the one or more lights generally featured on the front or back of a mobile device (e.g., a mobile phone). In one example use case, the at least one flashlight component may also include one or more synchronized sources of light (e.g., a light-emitting diode (LED) belt wrapped around the at least one device). In one or more embodiments, the system 100 then causes, at least in part, a configuration of the at least one flashlight component based, at least in part, on the at least one operational parameter (e.g., a light intensity parameter).

In certain embodiments, once a user begins walking towards his or her destination with the at least one mobile device, the system 100 determines the at least one operational parameter based, at least in part, on whether the one or more routes, the one or more guidance instructions, the one or more destinations, the one or more features, or a combination thereof is in a field of view of the at the least one device. More specifically, in one embodiment, the system 100 processes and/or facilitates a processing of sensor information associated with the at least one device (e.g., information determined from a GPS receiver, a compass, a magnetometer, a tilt or angle sensor, an accelerometer, etc.) to determine the field of view. Moreover, the system 100 also determines proximity information of the at least one device to the one or more routes, for example, wherein the at least one parameter is based, at least in part, on the proximity information. In particular, the system 100 may determine that the user is approaching an intersection where the one or more guidance instructions, for example, indicate that a suggested turn is forthcoming.

In one or more embodiments, the system 100 next causes, at least in part, an activation of the least one flashlight component when the one or more routes, the one or more guidance instructions, the one or more destinations, the one or more features, or a combination thereof is in the field of view of the at least one device. In particular, it is contemplated that the system 100 can provide the user with feedback as to whether he or she is on the right track towards his or her destination through the at least one flashlight component. More specifically, in one embodiment, the system 100 causes, at least in part, an increase or decrease of the at least one operational parameter (e.g., a light intensity parameter) when the one or more routes, for example, is in the field of view of the at least one device. By way of example, the more the user in the previous use case moves the field of view of his or her device towards the inputted destination, within a certain tolerance of an angle, the more the system 100 increases the intensity of the at least one flashlight component. In another example use case, the system 100 may increase the frequency of the blinking of the at least one flashlight component the more the user turns his or her device in the direction of the inputted destination.

In one embodiment, the system 100 can increase the intensity or the frequency of the blinking of the at least one flashlight component as the user in the prior example use case approaches the intersection so that the user understands that a suggested turn is imminent. Once at the intersection, the user can then point his or her device in different directions and the system 100 can cause the at least one flashlight component to shine brighter or blink more frequently when the compass or the magnetometer, for example, of the device is oriented in the direction of the suggested turn. As a result, the system 100 can guide pedestrian users in dark unfamiliar environments with the at least one flashlight component of the at least one device without also requiring a user to regularly look at his or her screen.

In another example use case, if the at least one device features a tiltable flashlight component, then the system 100 can cause, at least in part, a shift of the light from the flashlight in the direction of the correct turn. Moreover, in the example use case of the at least one device having access to one or more interior floor maps, a user may hold the at least one device above his or her head and based, at least in part, on a tilt or angle sensor, the system 100 may increase the at least one operational parameter (e.g., a light intensity parameter) the closer the at least one device is turned towards the intended target (e.g., office 703 or the $7^{th}$ Floor). Further, the system 100 may also cause, at least in part, an increase or decrease of the at least one operational parameter based, at least in part, on an estimated time of arrival (ETA). For example, the system 100 may cause a 100% emission of light from the at least one flashlight component when the at least one device is aimed towards a route that is estimated by the system 100 to take 10 minutes and the system 100 may cause a 50% emission of light when the device is aimed towards a route that is estimated by the system 100 to take 20 minutes.

In one embodiment, the system 100 may also cause, at least in part, a deactivation of the at least one flashlight component when the one or more routes, the one or more guidance instructions, the one or more destinations, the one or more features, or a combination thereof is not in the field of the view of the at least one device. By way of example, in the example use case where the one or more routes, for example, indicate that the user should make a left turn at the intersection en route to his or her destination, if the at least one device is pointed towards the right at the intersection, the system 100 can determine from the compass or the magnetometer, for example, that the device is pointed in the wrong direction and can therefore reduce the intensity of the at least one flashlight component or reduce the frequency of the blinking accordingly.

As shown in FIG. 1, the system 100 comprises a user equipment (UE) 101 (e.g., a mobile phone or a tablet) having connectivity to a coordination platform 103 via a communication network 105. The UE 101 includes or has access to a mapping/navigation application 107. By way of example, the mapping/navigation application 107 may include, at least in part, a navigation application, a mapping application, a location-based application, or a combination thereof. In addition, the UE 101 also includes one or more sensors 109a-109m (also collectively referred to as sensors 109). In particular, the sensors 109 may include, for example, a GPS receiver, a compass, a magnetometer, a tilt or angle sensor, an accelerometer, etc. In one embodiment, the coordination platform 103 may exist in whole or in part within the UE 101, or independently.

The UE 101 is also connected to a services platform 111 via the communication network 105. The services platform 111 includes one or more services 113a-113n (also collectively referred to as services 113). The services 113 may include a wide variety of services such as content provisioning services for the mapping/navigation application 107 (e.g., location-based services). In addition, the UE 101 and the services platform 111 are also connected to one or more content providers 115a-115p (also collectively referred to as content providers 115) via the communication network 105. The content providers 115 also may provide a wide variety of content (e.g., one or more maps) to the components of the system 100.

In one embodiment, the mapping/navigation application 107 utilizes location-based technologies (e.g., GPS, cellular triangulation, Assisted GPS (A-GPS), etc.) to make a request to the services 113 or the content providers 115 for location-based data (e.g., mapping and/or navigation information) based on a position relative to the UE 101. For example, the UE 101 may include a GPS receiver to obtain geographic coordinates from the satellites 117 to determine its current position.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the coordination platform 103 first determines mapping information, navigation information, or a combination thereof associated with at least one device (e.g., a mobile phone or a tablet). The coordination platform 103 next determines an input for specifying the one or more routes, the one or more guidance instructions, the one or more destinations, the one or more features, or a combination thereof. As previously discussed, in one example use case, a user on vacation may want to take a walk in an unfamiliar area one night after dinner. Accordingly, the user may input the desired destination in the mapping/navigation application 107 of the UE 101 to obtain directions to the destination.

In one or more embodiments, the coordination platform 103 then determines the one or more routes, for example, associated with the mapping information, the navigation information, or a combination thereof. In one embodiment, the coordination platform 103 next determines at least one operation parameter for at least one flashlight component of the UE 101 based, at least in part, on the mapping information, the navigation information, or a combination thereof. More specifically, the at least one operational parameter includes, at least in part, a light intensity parameter, a blinking frequency parameter, a light direction parameter, a light color parameter, or a combination thereof. In one or more embodiments, the coordination platform 103 then causes, at least in part, a configuration of the at least one flashlight component based, at least in part, on the at least one operational parameter (e.g., a light intensity parameter).

In certain embodiments, once a user begins walking towards his or her destination with the UE 101, the coordination platform 103 determines the at least one operational parameter based, at least in part, on whether the one or more routes, the one or more guidance instructions, the one or more destinations, the one or more features, or a combination thereof is in a field of view of the UE 101. More specifically, in one embodiment, the coordination platform 103 processes and/or facilitates a processing of sensor information from the sensors 109 to determine the field of view. Further, the coordination platform 103 also determines proximity information of the UE 101 to the one or more routes, for example, wherein the at least one parameter is based, at least in part, on the proximity information. By way of example, the coordination platform 103 may determine that the user is approaching an intersection where the one or more routes indicate that a suggested turn is forthcoming.

In one embodiment, the coordination platform 103 next causes, at least in part, an activation of the at least one flashlight component when the one or more routes, the one or more guidance instructions, the one or more destinations, the one or more features, or a combination thereof is in the field of view of the UE 101. By way of example, when the UE 101 (e.g., a mobile phone) is pointed towards the direction of the intended destination (e.g., the Eiffel Tower), within a certain tolerance of an angle, the coordination platform 103 activates at least one flashlight component of the UE 101. More specifically, in one or more embodiments, the coordination platform 103 causes, at least in part, an increase or decrease of the at least one operational parameter (e.g., a light intensity parameter) when the one or more routes, for example, is in the field of view of the UE 101. By way of example, the more the user in the previous example use case moves the field of view of the UE 101 towards the destination, the more the coordination platform 103 increases the intensity of the at least one flashlight component. In another example use case, the coordination platform 103 may increase the frequency of the blinking of the at least one flashlight component of the UE 101 the more the user directs the UE 101 towards the destination.

In one or more embodiments, the coordination platform 103 can increase the intensity of the at least one flashlight component or increase the frequency of the blinking as the user in the prior example use case approaches the intersection so that the user understands that a suggested turn is imminent. Once at the intersection, the user can then point the UE 101 in different directions and the coordination platform 103 can cause the at least one flashlight component to shine brighter or blink more frequently when one or more sensors 109 (e.g., a compass or a magnetometer) are pointed in the direction of the correct turn. In one embodiment, the coordination platform 103 may also cause, at least in part, a deactivation of the at least one flashlight component when the one or more routes, the one or more guidance instructions, the one or more destinations, the one or more features, or a combination thereof is not in the field of view of the UE 101. For example, in the example use case where the one or more routes indicate that the user should make a left turn at the intersection, if the UE 101 is pointed towards the right at the intersection, the coordination platform 103 can determine from the sensors 109 that the UE 101 is pointed in the wrong direction and can therefore reduce the intensity of the at least one flashlight component or reduce the frequency of the blinking accordingly.

By way of example, the UE 101, coordination platform 103, the mapping/navigation application 107, the services platform 111, the services 113, the content providers 115, and the satellites 117 communicate with each other and other components of the communication network 105 using current, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
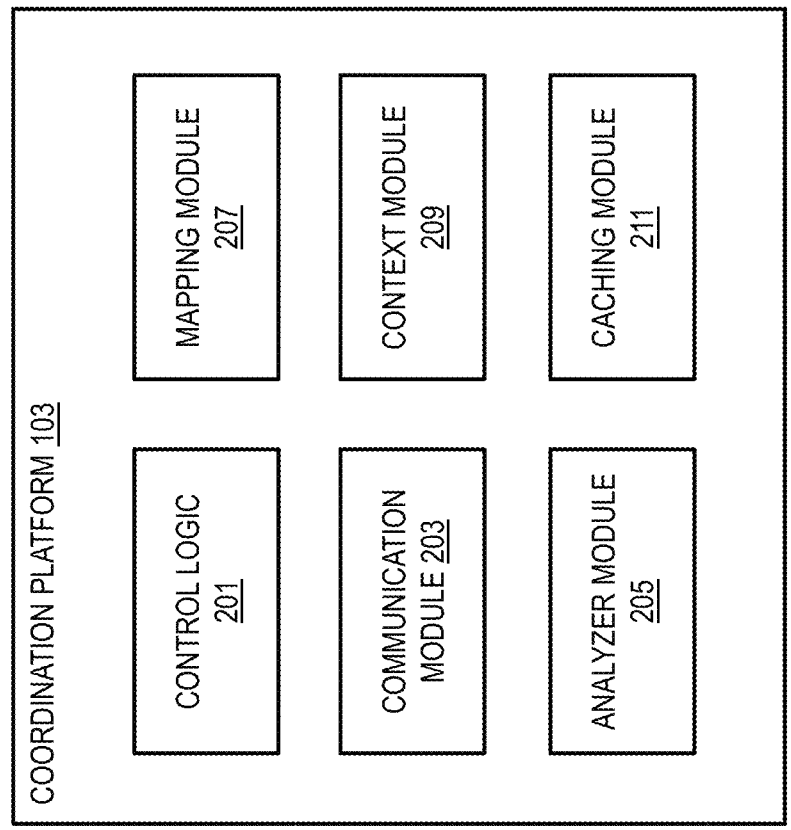
FIG. 2 is a diagram of the components of a coordination platform, according to one embodiment.

FIG. 2 is a diagram of the components of coordination platform 103, according to one embodiment. By way of example, the coordination platform 103 includes one or more components for linking the navigation and flashlight functions of a mobile device for guidance purposes. It is contemplated that the functions of these components may be combined in one or more components or performed by other components of equivalent functionality. In this embodiment, the coordination platform 103 includes a control logic 201, a communication module 203, an analyzer module 205, a mapping module 207, a context module 209, and a caching module 211.

The control logic 201 oversees tasks, including tasks performed by the communication module 203, the analyzer module 205, the mapping module 207, the context module 209, and the caching module 211. For example, although other modules may perform the actual task, the control logic 201 may determine when and how those tasks are performed or otherwise direct the other modules to perform the task. In addition, the control logic 201 may be used to cause, at least in part, a configuration of the at least one flashlight component based, at least in part, on the at least one operational parameter (e.g., a light intensity parameter). The control logic 201, in connection with the context module 209, also may be used to cause an activation or a deactivation of the at least one flashlight component, an increase or a decrease of the at least one operational parameter, or a combination thereof.

The communication module 203 is used for communication between the UE 101, the coordination platform 103, the mapping/navigation application 107, the services platform 111, the services 113, the content providers 115, and the satellites 117. The communication module 203 may also be used to communicate commands, requests, data, etc. The communication module 203 also may be used in connection with the analyzer module 205 for determining an input for specifying the one or more routes, the one or more guidance instructions, the one or more destinations, the one or more features, or a combination thereof.

As previously discussed, the analyzer module 205 is used in connection with the communication module 203 to determine an input for specifying the one or more routes, the one or more guidance instructions, the one or more destinations, the one or more features, or a combination thereof. The analyzer module 205 may also be used to determine at least one operational parameter for the at least one flashlight component of the at least one device based, at least in part, on the mapping information, the navigation information, or a combination thereof. By way of example, in one or more embodiments, the analyzer module 205 may determine the at least one operational parameter from one or more user inputs.

The mapping module 207 is used for determining mapping information, navigation information, or a combination thereof associated with the at least one device (e.g., a mobile phone or tablet). The mapping module 207 may also be used to determine one or more routes, one or more guidance instructions, one or more destinations, one or more features, or a combination thereof associated with the mapping information, the navigation information, or a combination thereof.

The context module 209 is used to determine the geographic context or situation of the UE 101 by utilizing location-based technologies (e.g., GPS receivers, cellular triangulation, A-GPS, etc.) to determine location-based information regarding the UE 101. The context module 209, in connection with the control logic 201, may also be used to determine the at least one operational parameter based, at least in part, on whether the one or more routes, for example, is in a field of view of the at least one device (e.g., a mobile phone or a tablet). The context module 209 also may be used to process and/or facilitate a processing of sensor information associated with the at least one device (e.g., compass or magnetometer data) to determine the field of view. Further, the context module 209, in connection with the mapping module 207, may also be used to determine proximity information of the at least one device to the one or more routes, the one or more guidance instructions, the one or more destinations, the one or more features, or a combination thereof. As previously discussed, the context module 209, in connection with the control logic 201, also may be used to cause an activation of the at least one flashlight component and/or an increase or a decrease of the at least one operational parameter when the one or more routes, for example, is in the field of view of the at least one device. The context module 209, in connection with the control logic 201, may also be used to cause, at least in part, a deactivation of the at least one flashlight component when the one or more routes, the one or more guidance instructions, the one or more destinations, the one or more features, or a combination thereof is not in the field of view of the at least one device.

The caching module 211 may be used to cache the at least one operational parameter for the at least one flashlight component of the at least one device. As previously discussed, the at least one operation parameter includes, at least in part, a light intensity parameter, a blinking frequency parameter, a light direction parameter, a light color parameter, or a combination thereof.

Figure 3:
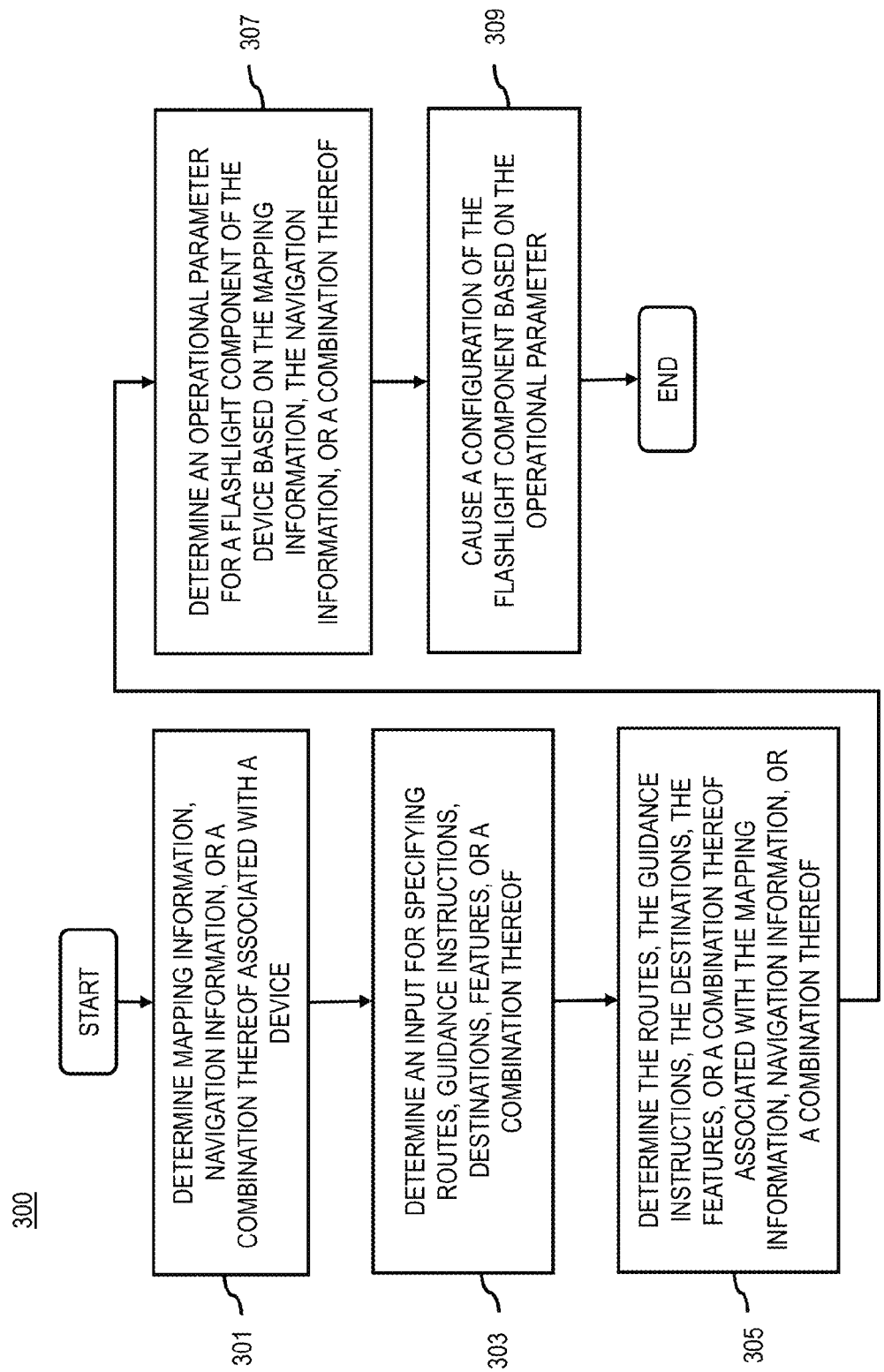
FIGS. 3 and 4 are flowcharts of processes for linking the navigation and flashlight functions of a mobile device for guidance purposes, according to one embodiment.
Figure 4:
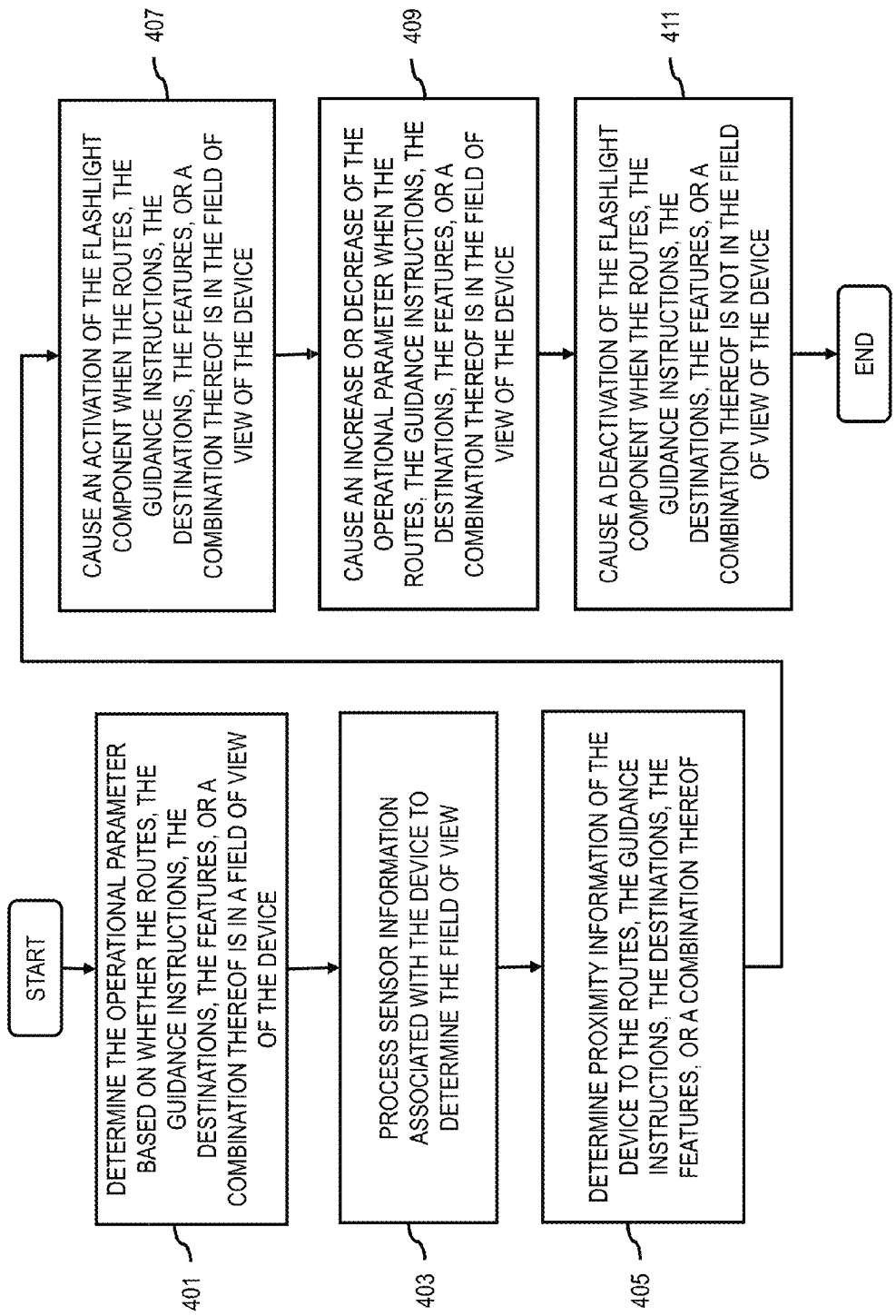
Figure 8:
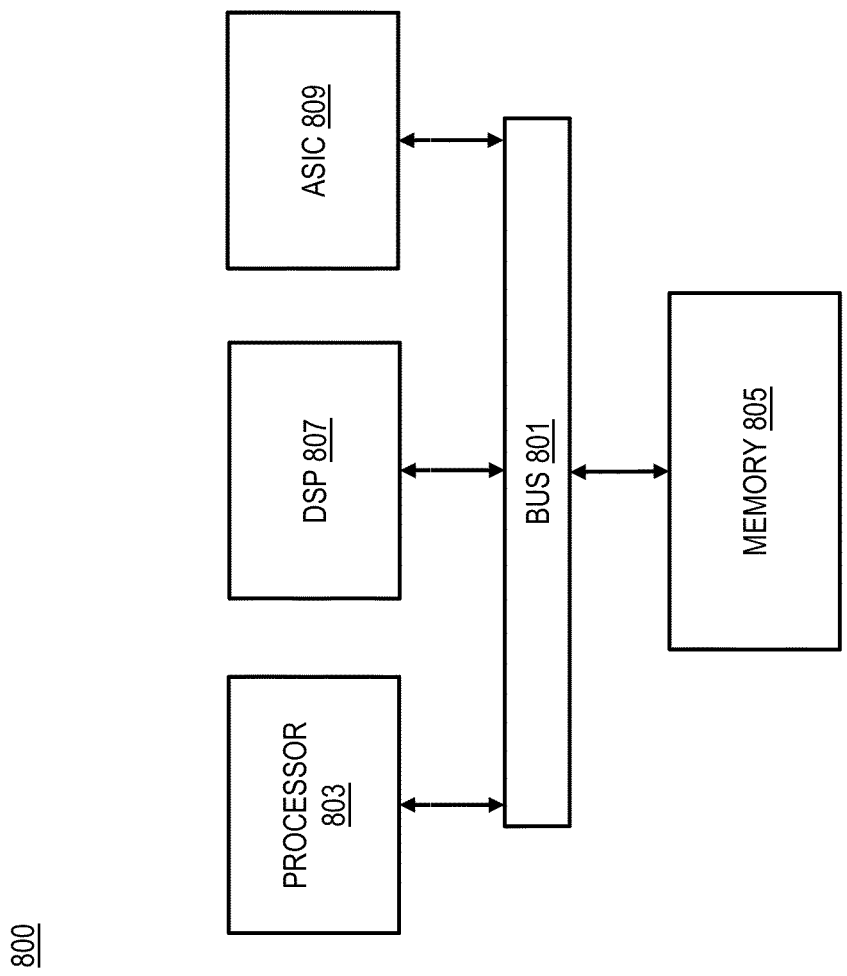
FIG. 8 is a diagram of a chip set that can be used to implement an embodiment of the invention.

FIGS. 3 and 4 are flowcharts of processes for linking the navigation and flashlight functions of a mobile device for guidance purposes, according to one embodiment. FIG. 3 depicts a process 300 of configuring at least one flashlight component of at least one device. In one embodiment, the coordination platform 103 performs the process 300 and is implemented in, for instance, a chip set including a processor and a memory as shown in FIG. 8. In step 301, the coordination platform 103 determines mapping information, navigation information, or a combination thereof associated with at least one device. As previously discussed, in one example use case, a user on vacation may want to take a walk in an unfamiliar area one night after dinner. More specifically, the user may want to walk from his or her hotel room to a well-known point of interest (e.g., the Eiffel Tower).

In step 303, the coordination platform 103 determines an input for specifying the one or more routes, the one or more guidance instructions, the one or more destinations, the one or more features, or a combination thereof. In the previous example use case, the user may input the destination (e.g., the Eiffel Tower) in a mapping and/or navigation application on his or her mobile device (e.g., a mobile phone or a tablet) to obtain directions to the destination. In addition to inputting a specific address, geo-coordinates, the name of a famous POI (e.g., the Eiffel Tower), etc., if the mapping and/or navigation application has access to one or more interior floor maps, then the user may also input a specific feature such as an office number or a building floor (e.g., office 703 or the 7$^{th}$ Floor). Further, it is contemplated that the input may include, at least in part, an entry using a user interface of the at least one device, one or more voice commands, one or more images of a particular point of interest, etc.

In step 305, the coordination platform 103 determines one or more routes, one or more guidance instructions, one or more destinations, one or more features, or a combination thereof associated with the mapping information, the navigation information, or a combination thereof. By way of example, the one or more features may include one or more points of interest or any other features or items of interest in the surrounding environment. Further, it is contemplated that in areas where limited mapping and/or navigation information is available (e.g., in the countryside), the coordination platform 103 may determine one or more routes, one or more guidance instructions, one or more destinations, one or more features, or a combination thereof based on a straight line trajectory between a starting point and the end destination.

In step 307, the coordination platform 103 determines at least one operational parameter for at least one flashlight component of the at least one device based, at least in part, on the mapping information, the navigation information, or a combination thereof. By way of example, the at least one operational parameter includes, at least in part, a light intensity parameter (e.g., increasing or decreasing the intensity of the emitted light), a blinking frequency parameter (e.g., increasing or decreasing the speed or the number of blinks), a light direction parameter (e.g., shifting the direction of the emitted light), a light color parameter (e.g., projecting a green or a red light to indicate a right or wrong direction, respectively), or a combination thereof. In addition, the at least one flashlight component includes, at least in part, an array of one or more lights, wherein the at least one operational parameter is for operating at least a portion of the array. As previously discussed, the at least one flashlight may include one or more lights generally featured on the front or back of a mobile device (e.g., a mobile phone) and/or one or more synchronized sources of light (e.g., a LED belt wrapped around the at least one device). In step 309, the coordination platform 103, causes, at least in part, a configuration of the at least one flashlight component based, at least in part, on the at least one operational parameter. As previously discussed, this configuration enables the coordination platform 103 to link or to coordinate the navigation and flashlight functions of the at least one device for guidance purposes.

FIG. 4 depicts a process 400 of determining location-based information associated with the at least one device and then activating or deactivating the at least one flashlight component of the at least one device based, at least in part, on the location-based information. In one embodiment, the coordination platform 103 performs the process 400 and is implemented in, for instance, a chip set including a processor and a memory as shown in FIG. 8. In step 401, the coordination platform 103 determines the at least one operational parameter based, at least in part, on whether the one or more routes, the one or more guidance instructions, the one or more destinations, the one or more features, or a combination thereof is in a field of view of the at least one device. More specifically, in step 403, the coordination platform 103 processes and/or facilitates a processing of sensor information associated with the at least one device to determine the field of view. By way of example, the field of view may include the direction the at least one device is facing and the sensor information may include information from a GPS receiver, a compass, a magnetometer, a tilt or angle sensor, an accelerometer, etc.

In step 405, the coordination platform 103 determines proximity information of the at least one device to the one or more routes, the one or more guidance instructions, the one or more destinations, the one or more features, or a combination thereof, wherein the at least one operational parameter is based, at least in part, on the proximity information. In particular, the coordination platform 103 may determine the proximity information based, at least in part, on the one or more sensors associated with the at least one device. Further, the coordination platform 103 may determine the proximity information to determine that a user is approaching an intersection where the one or more routes, for example, indicate that a suggested turn is forthcoming.

In step 407, the coordination platform 103 causes, at least in part, an activation of the at least one flashlight component when the one or more routes, the one or more guidance instructions, the one or more destinations, the one or more features, or a combination thereof is in the field of view of the at least one device. By way of example, when the at least one device (e.g., a mobile phone) is pointed towards the direction of an inputted destination (e.g., the Eiffel Tower), the coordination platform 103 activates the at least one flashlight component of the at least one device.

In step 409, the coordination platform 103 causes, at least in part, an increase or a decrease of the at least one operational parameter when the one or more routes, the one or more guidance instructions, the one or more destinations, the one or more features, or a combination thereof is in the field of view of the at least one device. In one example use case, the more the user moves the field of view of the at least one device towards the destination, the more the coordination platform 103 increases the intensity of the at least one flashlight component. In another example use case, the coordination platform 103 may increase the frequency of the blinking of the at least one flashlight component the more the at least one device is pointed towards the destination. Further, in the prior example use case of the user approaching an intersection where a suggested turn is imminent, it is contemplated that the coordination platform 103 can increase the intensity of the at least one flashlight or increase the frequency of the blinking as the user approaches the intersection so that the user understands that a suggested turn is forthcoming. An illustrated example of this determination by the coordination platform 103 is depicted in FIG. 6A. Once at the intersection, the user can point the at least one device in different directions and the coordination platform 103 can cause the at least one flashlight component to shine brighter or blink more frequently when the compass or the magnetometer, for example, of the at least one device is oriented in the direction of the correct turn. An illustrated example of this increase by the coordination platform 103 is depicted in the FIG. 6B.

In another example use case, if the at least one device features a tiltable flashlight component, then the coordination platform 103 can cause, at least in part, a shift of the light from the flashlight in the direction of the correct turn. Moreover, in the example use case of the at least one device having access to one or more interior floor maps, the user may hold the at least one device above his or her head and based, at least in part, on a tilt or angle sensor, the coordination platform 103 may increase the at least one operational parameter (e.g., a light intensity parameter) the closer the at least one device is turned towards the intended target (e.g., office 703 or the 7th Floor). Further, the coordination platform 103 may also cause, at least in part, an increase or decrease of the at least one operational parameter based, at least in part, on an ETA. For example, the coordination platform 103 may cause a 100% emission of light from the at least one flashlight component when the at least one device is pointed towards a route that is estimated by the coordination platform 103 to take 10 minutes and the coordination platform 103 may cause a 50% emission of light from the at least one flashlight component when the device is pointed towards a route that is estimated by the coordination platform to take 20 minutes.

In step 411, the coordination platform 103 causes, at least in part, a deactivation of the at least one flashlight component when the one or more routes, the one or more guidance instructions, the one or more destinations, the one or more features, or a combination thereof is not in the field of view of the at least one device. By way of example, in the example use case where the one or more routes, for example, indicate that the user should make a left turn at the intersection en route to his or her destination, if the at least one device is pointed towards the right at the intersection, the coordination platform 103 can determine from the compass or the magnetometer, for example, that the at least one device is pointed in the wrong direction and can therefore reduce the intensity of the at least one flashlight component or reduce the frequency of the blinking accordingly.

Figure 5:
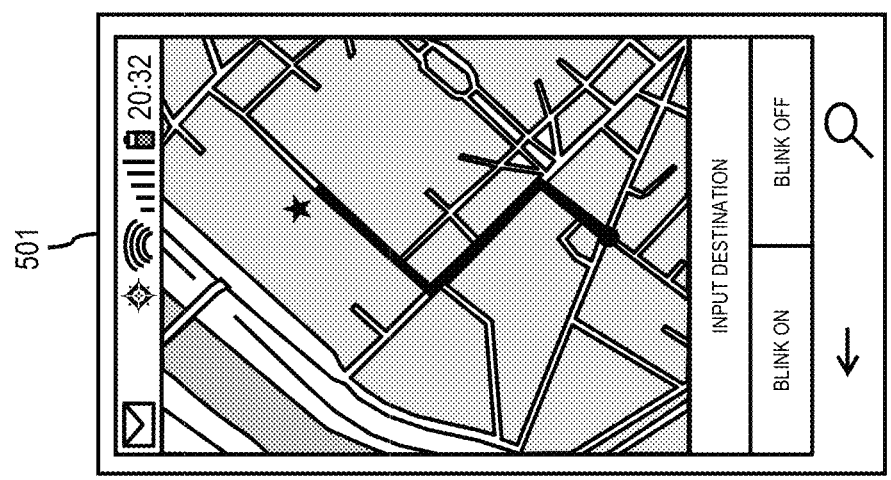
FIG. 5 is a diagram of a user interface utilized in the processes of FIGS. 3 and 4, according to various embodiments.

FIG. 5 is a diagram a user interface utilized in the processes of FIGS. 3 and 4, according to various embodiments. As shown, the example user interface of FIG. 5 includes one or more user interface elements and/or functionalities created and/or modified based, at least in part, on information, data, and/or signals resulting from the processes (e.g., processes 300 and 400) described in FIGS. 3 and 4. More specifically, FIG. 5 illustrates a user interface 501. As previously discussed, the system 100 first determines mapping information, navigation information, or a combination thereof associated with at least one mobile device (e.g., a mobile phone or a tablet). The system 100 next determines an input for specifying the one or more routes, the one or more guidance instructions, the one or more destinations, the one or more features, or a combination thereof. As previously discussed, in one example use case, a user on vacation may want to take a walk in an unfamiliar area one night after dinner. Accordingly, the user may input a destination (e.g., the Eiffel Tower) using the "input destination" button of the interface 501 to obtain directions to the destination.

In one embodiment, the system 100 then determines the one or more routes, for example, associated with the mapping information, the navigation information, or a combination thereof. The system 100 next determines at least one operational parameter for at least one flashlight component of the at least one device based, at least in part, on the mapping information, the navigation information, or a combination thereof. As previously discussed, the at least one operational parameter includes, at least in part, a light intensity parameter, a blinking frequency parameter, a light direction parameter, a light color parameter, or a combination thereof. More specifically, in this example use case, it is contemplated that a light intensity parameter may function as a default parameter, but that the user may later change this parameter by using the "blink on" and "blink off" buttons of the interface 501. In particular, it is contemplated that once the user starts walking towards his or her destination, the system 100 can provide the user with feedback as to whether he or she is on the right track through the at least one flashlight component.

Figure 6B:
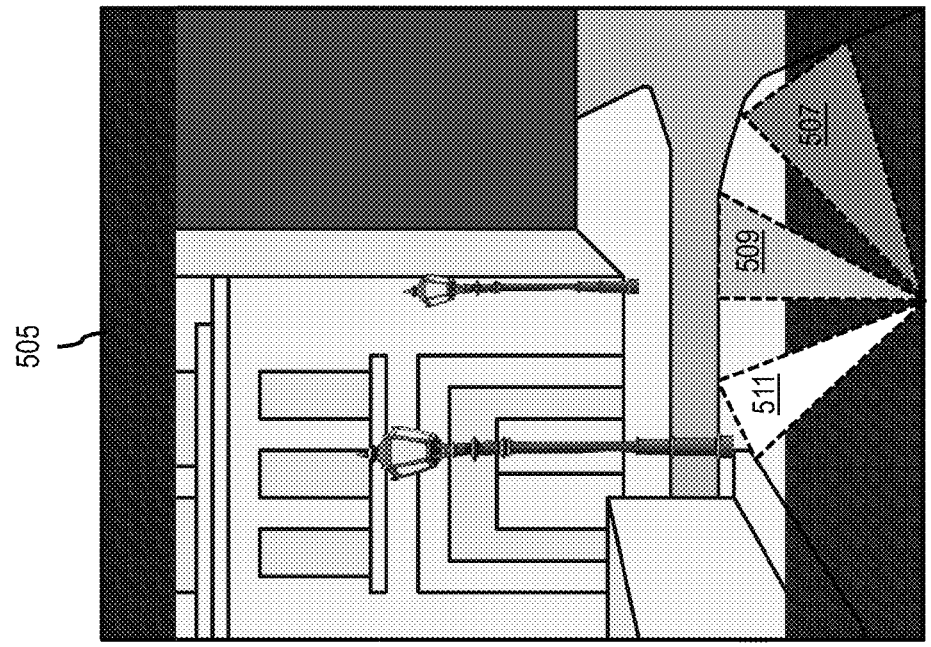
FIGS. 6A and 6B are diagrams of an example use case depicting the utilization of the processes of FIGS. 3 and 4, according to various embodiments.
Figure 6A:
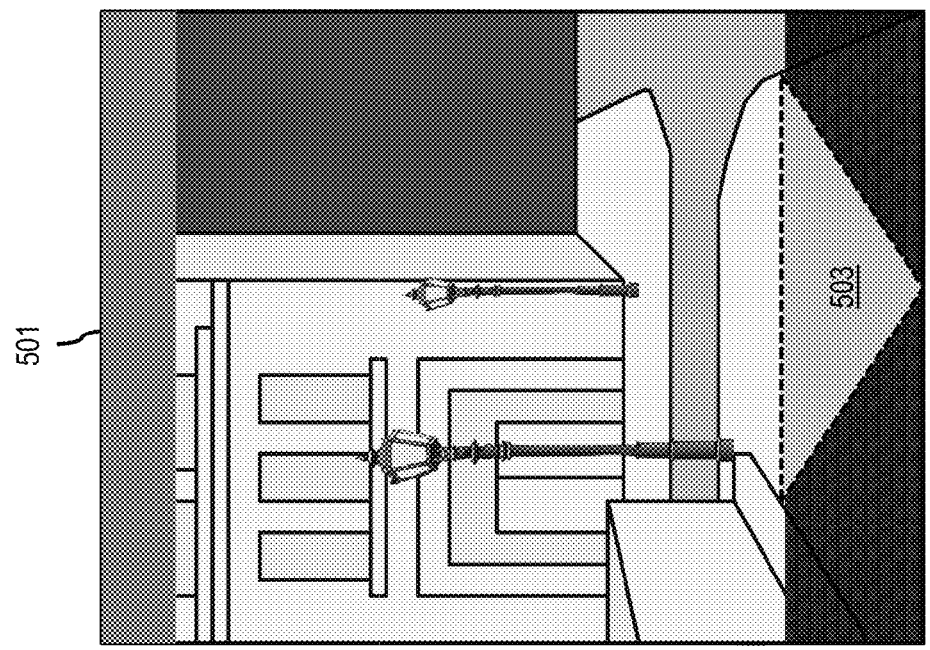

FIGS. 6A and 6B are diagrams of an example use case depicting the utilization of the processes of FIGS. 3 and 4, according to various embodiments. As shown, FIG. 6A depicts a field of view 501 of at least one device (e.g., a mobile phone or a tablet). As previously discussed, based on the sensor information and the proximity information of the at least one device, the system 100 can determine that a user is approaching an intersection where the one or more guidance instructions, for example, indicate a suggested turn is forthcoming. As a consequence, the system 100 can increase the intensity of the emitted light 503 of at least one flashlight component of the at least one device so that the user understands that a suggested turn is approaching. Alternatively, the system 100 can increase the frequency of the blinking of the at least one flashlight component or possibly shift the direction of the light in the direction of the destination. In one embodiment, once the user reaches the interaction as depicted in the field of view 505 of FIG. 6B, the user can point the at least one device in different directions and the system 100 can cause the at least one flashlight component to shine brighter or blink more frequently when the compass or the magnetometer, for example, of the at least one device is oriented in the direction of the correct turn as depicted by the emitted lights 507, 509, and 511, respectively. As a result, the system 100 can guide the user to make a left turn following emitted light 511 using the at least one flashlight component of the at least one device without also requiring the user to look at his or her screen.

The processes described herein for linking the navigation and flashlight functions of a mobile device for guidance purposes may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
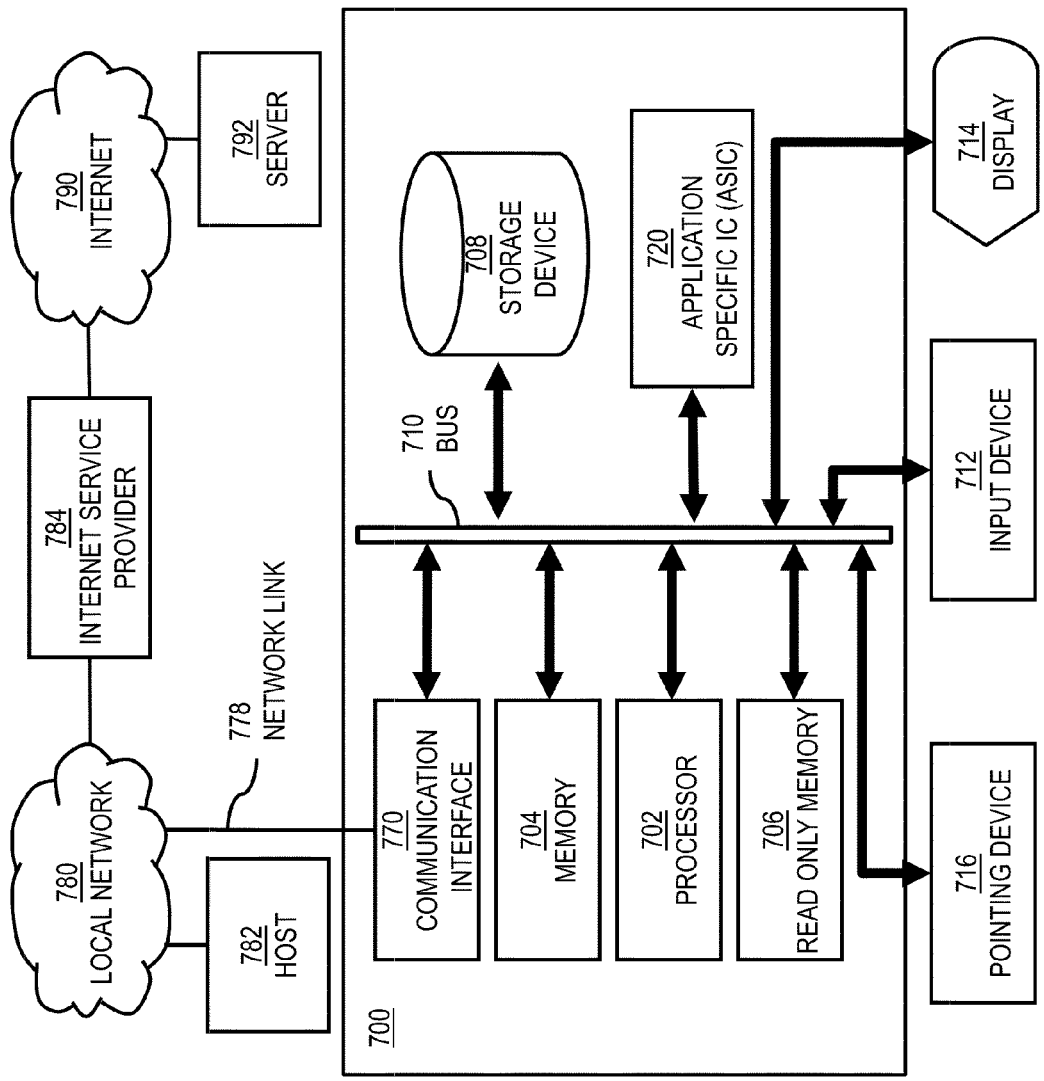
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to link the navigation and flashlight functions of a mobile device for guidance purposes as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of linking the navigation and flashlight functions of a mobile device for guidance purposes.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to link the navigation and flashlight functions of a mobile device for guidance purposes. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for linking the navigation and flashlight functions of a mobile device for guidance purposes. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for linking the navigation and flashlight functions of a mobile device for guidance purposes, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for linking the navigation and flashlight functions of a mobile device for guidance purposes to the UE 101.

The term "computer-readable medium" as used herein refers to any medium that participates in providing information to processor 702, including instructions for execution.

Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to link the navigation and flashlight functions of a mobile device for guidance purposes as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of linking the navigation and flashlight functions of a mobile device for guidance purposes.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to link the navigation and flashlight functions of a mobile device for guidance purposes. The memory 805 also stores the data associated with or generated by the execution of the inventive steps.

Figure 9:
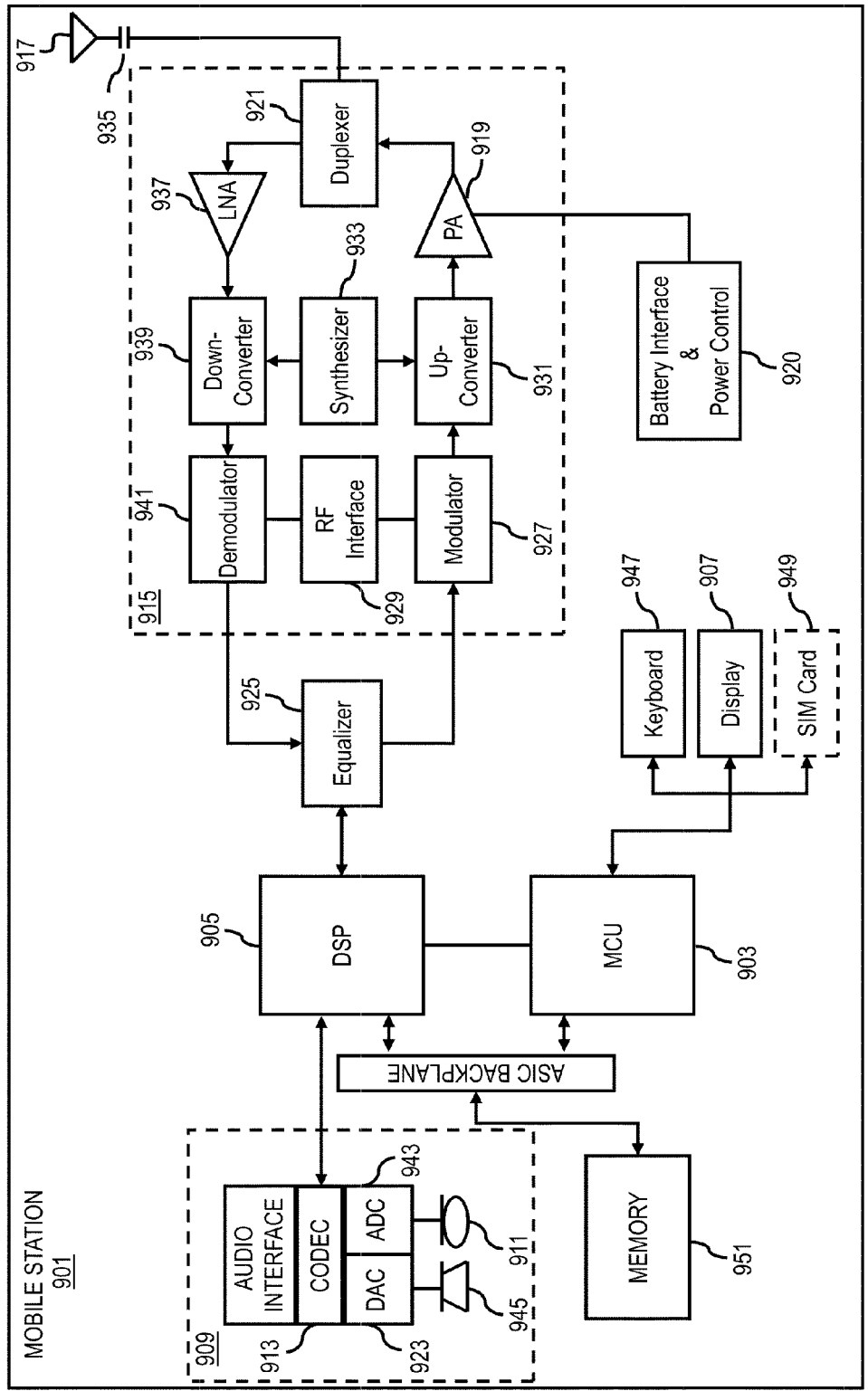
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of linking the navigation and flashlight functions of a mobile device for guidance purposes. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of linking the navigation and flashlight functions of a mobile device for guidance purposes. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to link the navigation and flashlight functions of a mobile device for guidance purposes. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:

at least one determination of mapping information, navigation information, or a combination thereof associated with at least one device;

at least one change of at least one operational parameter for at least one flashlight component of the at least one device based, at least in part, on the mapping information, the navigation information, or a combination thereof, to include a directional feedback in at least one real-world light that is projected by the at least one flashlight component and aims towards a current travel route of the at least one device in a dark real-world environment; and a configuration of the at least one flashlight component based, at least in part, on the at least one change of the at least one operational parameter.

2. A method of claim 1, wherein the directional feedback indicates whether the current travel route aims towards a real-world travel destination associated with the at least one device, and the (1) data and/or (2) information and/or (3) at least one signal are further based, at least in part, on the following:

at least one determination of one or more routes, one or more guidance instructions, one or more destinations, one or more features, or a combination thereof associated with the mapping information, the navigation information, or a combination thereof, wherein the one or more routes include the current route;

the at least one change includes shifting a direction of the at least one light, and at least one change of the at least one operational parameter based, at least in part, on whether the one or more routes, the one or more guidance instructions, the one or more destinations, the one or more features, or a combination thereof is in a field of view of the at least one device.

3. A method of claim 2, wherein the (1) data and/or (2) information and/or (3) at least one signal are further based, at least in part, on the following:

a processing of sensor information associated with the at least one device to determine the field of view, wherein the at least one change includes changing a color of the at least one light when the light aims away from the one or more routes, the one or more guidance instructions, the one or more destinations, or a combination thereof.

4. A method of claim 2, wherein the at least one change further includes an increase or a decrease of the at least one operational parameter when the one or more routes, the one or more guidance instructions, the one or more destinations, the one or more features, or a combination thereof is in the field of view of the at least one device.

5. A method of claim 2, wherein the at least one change further includes an activation of the at least one flashlight component when the one or more routes, the one or more guidance instructions, the one or more destinations, the one or more features, or a combination thereof is in the field of view of the at least one device.

6. A method of claim 2, wherein the at least one change further includes a deactivation of the at least one flashlight component when the one or more routes, the one or more guidance instructions, the one or more destinations, the one or more features, or a combination thereof is not in the field of view of the at least one device.

7. A method of claim 2, wherein the (1) data and/or (2) information and/or (3) at least one signal are further based, at least in part, on the following:

at least one determination of an input for specifying the one or more routes, the one or more guidance instructions, the one or more destinations, the one or more features, or a combination thereof.

8. A method of claim 2, wherein the (1) data and/or (2) information and/or (3) at least one signal are further based, at least in part, on the following:
   at least one determination of proximity information of the at least one device to the one or more routes, the one or more guidance instructions, the one or more destinations, the one or more features, or a combination thereof,
   wherein the at least one operational parameter is based, at least in part, on the proximity information.

9. A method of claim 1, wherein the at least one flashlight component includes, at least in part, an array of one or more lights, and wherein the at least one operational parameter is for operating at least a portion of the array.

10. A method of claim 1, wherein the at least one operational parameter includes, at least in part, a light intensity parameter, a blinking frequency parameter, a light direction parameter, a light color parameter, or a combination thereof, and
   the at least one change includes an increase or a decrease of the at least one operational parameter in proportion with an estimated time of arrival of the at least one device.

11. An apparatus comprising:
   at least one processor; and
   at least one memory including computer program code for one or more programs,
   the at least one memory and the computer program code configured to, with the at least one processor, cause the apparatus to perform at least the following,
   determine mapping information, navigation information, or a combination thereof associated with at least one device;
   change at least one operational parameter for at least one flashlight component of the at least one device based, at least in part, on the mapping information, the navigation information, or a combination thereof, to include a directional feedback in at least one real-world light that is projected by the at least one flashlight component and aims towards a current travel route of the at least one device in a dark real-world environment; and
   cause, at least in part, a configuration of the at least one flashlight component based, at least in part, on the at least one change of the at least one operational parameter.

12. An apparatus of claim 11, wherein the directional feedback indicates whether the current travel route aims towards a real-world travel destination associated with the at least one device, and the apparatus is further caused to:
   determine one or more routes, one or more guidance instructions, one or more destinations, one or more features, or a combination thereof associated with the mapping information, the navigation information, or a combination thereof; and
   change the at least one operational parameter based, at least in part, on whether the one or more routes, the one or more guidance instructions, the one or more destinations, the one or more features, or a combination thereof is in a field of view of the at least one device.

13. An apparatus of claim 12, wherein the apparatus is further caused to:
   process and/or facilitate a processing of sensor information associated with the at least one device to determine the field of view.

14. An apparatus of claim 12, wherein the at least one change further includes an increase or a decrease of the at least one operational parameter when the one or more routes, the one or more guidance instructions, the one or more destinations, the one or more features, or a combination thereof is in the field of view of the at least one device.

15. An apparatus of claim 12, wherein the at least one change further includes an activation of the at least one flashlight component when the one or more routes, the one or more guidance instructions, the one or more destinations, the one or more features, or a combination thereof is in the field of view of the at least one device.

16. An apparatus of claim 12, wherein the at least one change further includes a deactivation of the at least one flashlight component when the one or more routes, the one or more guidance instructions, the one or more destinations, the one or more features, or a combination thereof is not in the field of view of the at least one device.

17. An apparatus of claim 12, wherein the apparatus is further caused to:
   determine an input for specifying the one or more routes, the one or more guidance instructions, the one or more destinations, the one or more features, or a combination thereof.

18. An apparatus of claim 12, wherein the apparatus is further caused to:
   determine proximity information of the at least one device to the one or more routes, the one or more guidance instructions, the one or more destinations, the one or more features, or a combination thereof,
   wherein the at least one operational parameter is based, at least in part, on the proximity information.

19. An apparatus of claim 11, wherein the at least one flashlight component includes, at least in part, an array of one or more lights, and wherein the at least one operational parameter is for operating at least a portion of the array.

20. An apparatus of claim 11, wherein the at least one operational parameter includes, at least in part, a light intensity parameter, a blinking frequency parameter, a light direction parameter, a light color parameter, or a combination thereof.

* * * * *